United States Patent [19]

Vollmer et al.

[11] Patent Number: 4,703,827
[45] Date of Patent: Nov. 3, 1987

[54] SAFETY APPARATUS FOR VEHICLES

[75] Inventors: Elmar Vollmer, Wettstetten; Jens Hofmann, Lenting; Helmut Adam, Ingolstadt, all of Fed. Rep. of Germany

[73] Assignee: Audi A.G., Ingolstadt, Fed. Rep. of Germany

[21] Appl. No.: 745,770

[22] PCT Filed: Oct. 12, 1984

[86] PCT No.: PCT/DE84/00211
§ 371 Date: Aug. 8, 1985
§ 102(e) Date: Aug. 8, 1985

[87] PCT Pub. No.: WO85/01709
PCT Pub. Date: Apr. 25, 1985

[30] Foreign Application Priority Data

Oct. 13, 1983 [DE] Fed. Rep. of Germany ....... 3337231

[51] Int. Cl.$^4$ .............................................. B60R 22/00
[52] U.S. Cl. ...................................... 180/232; 180/274
[58] Field of Search ....................... 180/232, 271, 274; 280/748, 777, 750; 296/65 R, 189

[56] References Cited

U.S. PATENT DOCUMENTS

| 2,900,036 | 8/1959 | Blake | 180/232 |
| 3,423,124 | 1/1969 | Hewitt | 296/65 A |
| 3,464,284 | 9/1969 | Fergle | 180/271 |
| 3,578,782 | 10/1969 | Miyoshi | 180/232 |
| 3,589,466 | 6/1971 | Dudley | 180/232 |
| 3,627,345 | 12/1971 | Le Mire | 280/777 |
| 3,929,203 | 12/1975 | Nagazumi | 180/232 |
| 4,143,735 | 3/1979 | Schlanger | 180/274 |

FOREIGN PATENT DOCUMENTS

| 1655597 | 7/1970 | Fed. Rep. of Germany . |
| 1630477 | 8/1971 | Fed. Rep. of Germany . |
| 2120174 | 11/1972 | Fed. Rep. of Germany . |
| 2159265 | 6/1973 | Fed. Rep. of Germany . |
| 2216378 | 10/1973 | Fed. Rep. of Germany . |
| 2246077 | 3/1974 | Fed. Rep. of Germany . |
| 2330950 | 1/1975 | Fed. Rep. of Germany . |
| 2548022 | 5/1976 | Fed. Rep. of Germany . |
| 2809664 | 9/1979 | Fed. Rep. of Germany . |
| 1012718 | 7/1952 | France . |
| 1594234 | 7/1970 | France . |
| 2219867 | 9/1974 | France . |
| 2237452 | 2/1975 | France . |
| 2241968 | 3/1975 | France . |
| 2289367 | 5/1976 | France . |
| 2324321 | 4/1977 | France . |
| 2370601 | 6/1978 | France . |
| 1528908 | 10/1978 | United Kingdom . |

Primary Examiner—John J. Love
Assistant Examiner—Karin L. Ferriter
Attorney, Agent, or Firm—Karl Hormann

[57] ABSTRACT

A safety apparatus for removing the steering wheel of an automotive vehicle from a zone of potential impact with the head of a driver, in case of collision, including a substantially unstretchable connecting member between the steering wheel and a part of the vehicle likely to move forwardly relative to the chassis in case of collision and transferring such movement to the steering wheel to withdraw it towards the dashboard. The steering wheel may be mounted on an axially collapsible column.

9 Claims, 4 Drawing Figures

SAFETY APPARATUS FOR VEHICLES

This application is related to application Ser. No.: 749,532 filed June 13, 1985.

The invention is directed to safety apparatus for vehicles more particularly, the invention relates to novel apparatus for removing the steering wheel of a vehicle from a zone of possible impact with the head of a driver.

In case of a heavy frontal collision one may often observe the head of the driver impacting with the steering wheel even though the drive may be wearing a seatbelt. This is caused by the momentum resulting either in a strong forward movement of the upper body and head of the driver and/or by the steering wheel being pushed into the passenger cabin by the steering column, in a frontal collision.

In order to reduce the effects of an impact of the head it is known to provide the steering wheel with a collision plate. An airbag, too, may reduce the risk of injury. Neither apparatus may, however, totally prevent an injury caused by the steering arrangement. The airbag in particular is very complicated owing to its inflation device and its sensor, and is unacceptable for certain users.

The task of the invention resides in preventing, by simple means, the head of the driver from impacting with the steering wheel in case of a frontal collision.

The task is solved by the elements listed in the characterizing portion of claim 1.

An impact of the head may be prevented by removing the steering wheel from the area where the head may impact, by means of the safety apparatus actuated in case of a frontal collision of predetermined magnitude, that is to say, that instead of merely attempting to reduce the effects of an impact, as is the case with known devices, the cause for a possible injury to the head is removed.

In accordance with the invention, the removal of the steering wheel in case of a frontal collision may be accomplished mechanically.

For removing the steering wheel from the area of a possible head impact various kinematic means are possible, depending upon structural conditions; for instance lateral or upward pivoting of the steering column is conceivable. It is, however, particularly advantageous to remove the steering wheel substantially vertically with respect to the surface circumscribed by it, in a direction toward the front of the vehicle, i.e. away from the driver. Such a direction of movement can be easily controlled and would lead to the steering wheel engaging, or even penetrating into, the dash board.

It is of particular advantage if the safety apparatus comprises a mechanism which utilizes the relative movement between an aggregate (e.g. the engine-transmission-aggregate) positioned in a frontal portion of a vehicle and an element of the frame (e.g. a cross bar or girder in the area of the fire wall) positioned in a forward portion of the passenger compartment for removing the steering wheel in case of a frontal collision.

Such movement may, for instance, be transferred to the steering wheel by a cable. Of course, means must be provided for reversing the direction of movement as the steering wheel is to be moved in a direction opposite the direction of movement of the aggregate relative to the chassis.

By taking advantage of the relative movement between the aggregate and the passenger compartment during a frontal collision a very large force and a sufficient stroke are available. In this connection, the proportionality between this force and the impact energy is of advantage. Also, the direct relationship between the displacement of the components and the impact of the collision contribute to the effectiveness of the apparatus. Relative movement between the aggregate and the frame—and especially the passenger compartment—results from the fact that shortly after the frontal collision the aggregate engages the barrier or obstacle and the frame additionally moves across the aggregate.

In contrast to known devices—the airbag, for instance—no sensor is necessary because the safety apparatus operates as a result of deformation resulting from a frontal collision. Unintentional release is, therefore impossible also.

Advantageously the mechanism transferring the displacement motion comprises a cable attached to the aggregate and an element connected to the steering wheel and turned around at an element of the frame (e.g. by a pulley or a curved tube). Large force may be transferred and tolerances may be balanced by the cable. The turn around of the cable should be located at a position suffering from little deformability. Where this is either not possible or possible to a limited extent only the cable may be dimensioned in accordance with the lesser deformation of the element at which the turn around takes place.

In a preferred embodiment of the safety apparatus in accordance with the invention a sufficiently large displacement of the cable even at a relatively small movement of the aggregate relative to the frame or chassis of the vehicle, may be possible by a mechanical advantage derivable, for instance, by a shackle-like arrangement of the cable. Such lesser relative displacements of the aggregate may occur, for instance, where frontal sections of the vehicle are relatively rigid or where the aggregate is a transversally mounted engine. The desired transfer ratio may be obtained by attaching the end of the cable opposite the steering wheel to a heavy structural frame member instead of to the aggregate, and by forming a loop in the cable which is engaged by a backward-facing portion of the aggregate or an arm provided thereon.

In respect of the arrangement of the cable it is advantageous to mount it loosely, i.e. with some slack, to limit the maximum displacement of the steering wheel relative to a predetermined maximum displacement of the aggregate. This would protect against rupture of the cable and prevent an undesirable rebounding of the steering wheel. It is also possible, however, to provide for a tension limiting device which would cause the cable to break or expand in a predetermined manner. For this purpose the cable, between its point of attachment to an element connected to the steering wheel and the tension limiting device, would preferably also be clamped to an element of the frame. By such means a rebounding of the steering wheel may be prevented even where a tension limiting device is used, in a manner similar to an expansion device.

Instead of using a cable for the transfer of force, a hydraullic actuation may be used to similar advantage. For this purpose a donor or master cylinder may be affected by the relative movement of the aggregate in a frontal collision, the cylinder being mounted rigidly to the frame at an appropriate position. Transfer of energy is accomplished by hydraulic fluid (pumped) into a receiving slave cylinder which may also be rigidly mounted to the frame. When the receiving cylinder is pressurized it pulls the steering column and, hence, the steering wheel into or toward the dash board. Preferably a check valve is provided within the hydraulic conduit (between the two cylinders) for preventing a rebounding of the steering column. Hydraulic actuation permits an early response as well as, in a simple manner, a mechanical advantage by selecting the diameters of the pistons in the hydraulic cylinders.

Safety apparatus equipped with a release sensor may provide for mechanisms comprising a cable attached to a piston positioned in an explosive cylinder and to an element attached to the steering wheel. In such an arrangement it is of particular advantage to have the sensor react between relative displacement between an aggregate positioned in a front portion and an element of the frame located further to the rear. This would assure improved operational safety relative to release sensors reacting to forces of inertia. Improved functional safety is necessary because after an accidental release or a light collision the vehicle could no longer be steered.

It goes without saying that it is not only the steering wheel which should be removed but also other components which are directly connected to the steering wheel or which would protrude into the passenger compartment. Depending upon the type of construction it may be necessary to move the entire steering column unit forwardly. For this purpose the use of steering columns would be advantageous which permit movement in the direction of the steering linkage or transmission, or toward the forward wall. For displacement or contraction such known steering columns may comprise collapsible tubular screen or corrugated sections, double universal joints, a telescoping arrangement or elements which when subjected to compressive force will separate.

Several embodiments of the invention have been depicted in the drawing and will hereinafter be described. In the the drawings, FIG. 1 is a schematic representation of a safety apparatus comprising a cable, in a passenger automobile;

Figure 1:
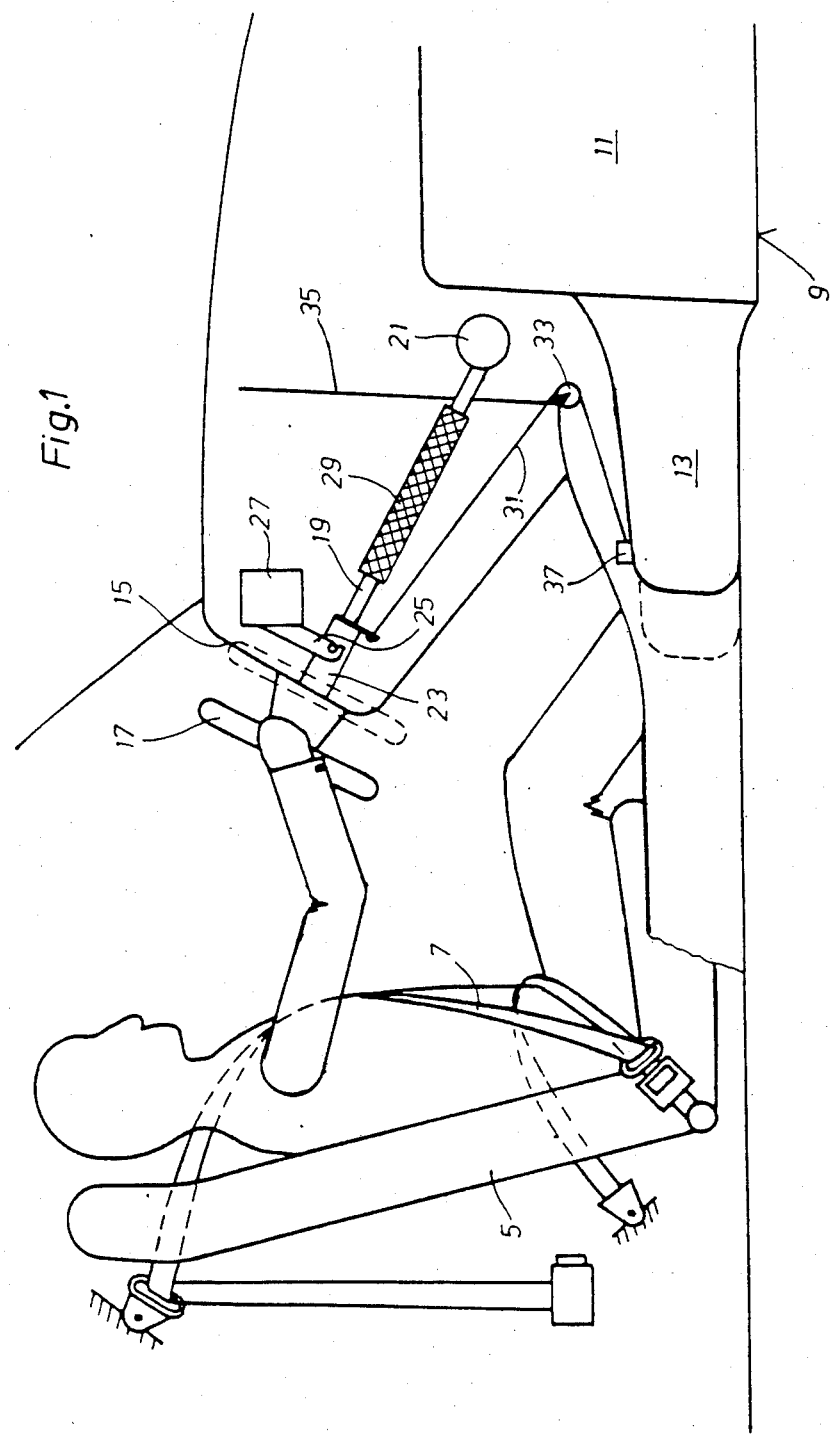

FIG. 1 schematically depicts a forward interior section of a passenger automobile compartment. A person is secured in the driver's seat 5 of the passenger automobile by means of a known three-point seat belt 7. A drive aggregate 9 is located in the front of the vehicle and comprises a longitudinally mounted engine 11 with a transmission 13 extending rearwardly thereof.

As may be seen from FIG. 1, a steering wheel 17 is arranged approximately parallel to a dashboard 15 and is connected to a steering transmission 21 by means of a steering colum 19. A non-rotatable bearing portion or block 23 of the steering column 19 is affixed to a cross bar 27 of the chassis adjacent the dashboard 15 by means of a bracket 25. The connection of the bearing block 23 to the bracket 25 is such that it permits disengagement under predetermined conditions.

In order to make possible an axial displacement of the steering column 19 and, hence, of the steering wheel 17, the steering column 19 comprises a section formed of a collapsible grid-like tube 29 which under a predetermined load permits an axial displacement.

Finally, a cable 31 is connected to the bearing block 23 of the steering column 19. Near a fire wall 35 of the vehicle the cable 31 is guided around a pulley 33 and extends to a bracket 37 connected to the transmission 13.

In case of a frontal collision the aggregate 9 will be engaged by, or impact with, an impediment or obstacle, even at a minor deformation of the frontal portion of the vehicle, and more easily deformable portions of the chassis move over the drive aggregate 9. This results in relative movement between the drive aggregate 9 and the chassis of the vehicle (as shown in dashed lines). This relative movement is transferred to the steering wheel 17 via the bearing portion 23 by means of the cable 31 attached to the transmission 13 whereby the steering wheel 17 is pulled into the dashboard 15. Simultaneously with the movement the bracket 25 is unlatched from the bearing portion 23, and the grid-like tube 29 is compressed or collapsed in an axial direction.

Figure 2:
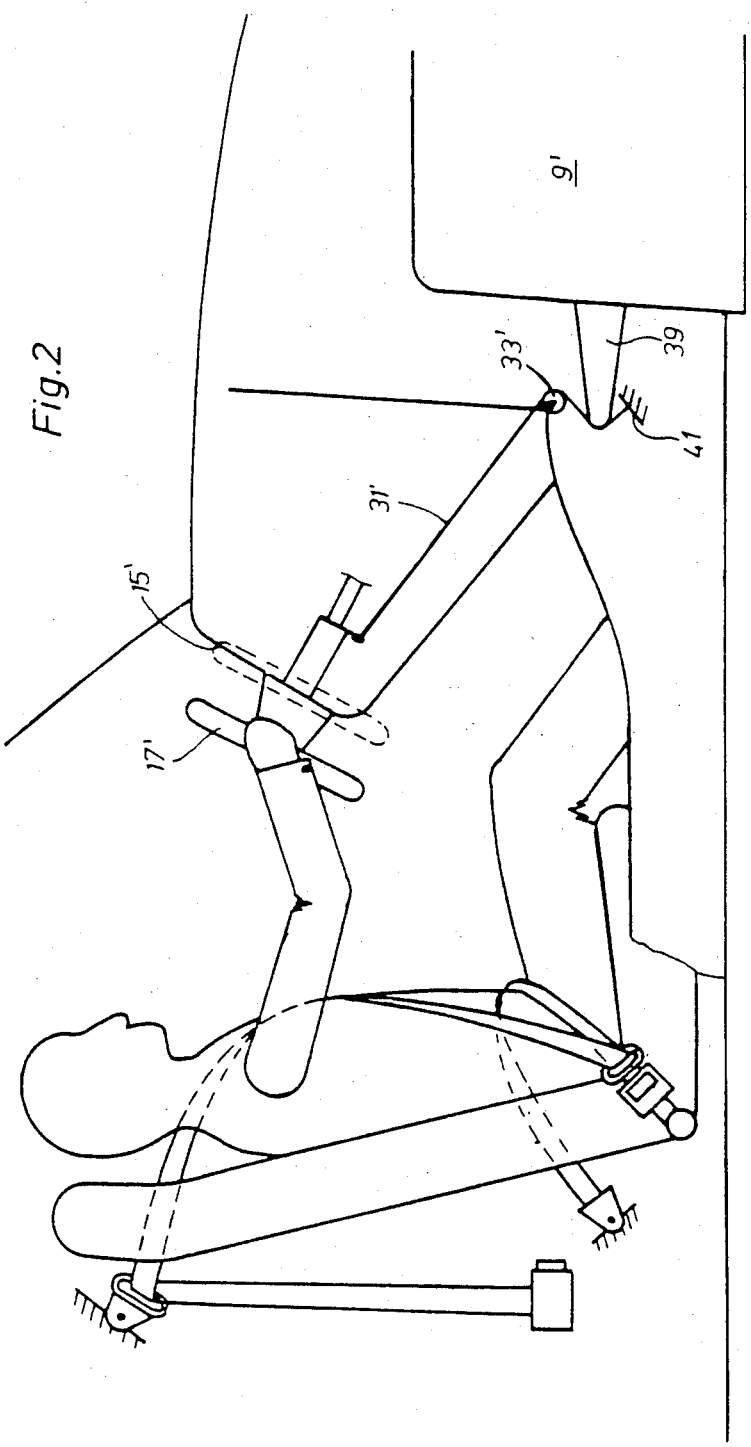
FIG. 2 depicts an embodiment in which the cable, for obtaining a mechanical advantage, is guided differently.

The embodiment of FIG. 2 is similarly constructed; therefore, the differences only will be discussed. The same reference characters, but primed, will be used in connection with like or similar components.

The problem upon which the second embodiment is based is that with a relatively rigid front portion of a vehicle having a transversally mounted engine only minor relative movement occurs in a frontal collision which may not cause the steering wheel 17' to move sufficiently far towards the dashboard 15'. For this reason a mechanical advantage has been provided by a different connection of the cable 31'. Instead of attaching the cable 31' to the drive aggregate 9' it is directly attached to a rigid element of the chassis. The drive aggregate 9' supports an arm 39 which engages the cable 31' between the pulley 33' and its point of attachment 41 to the chassis. This arrangement yields a mechanical advantage to move the steering wheel 17' twice the distance of the relative movement between the drive aggregate 9' and the chassis of the vehicle.

Figure 3:
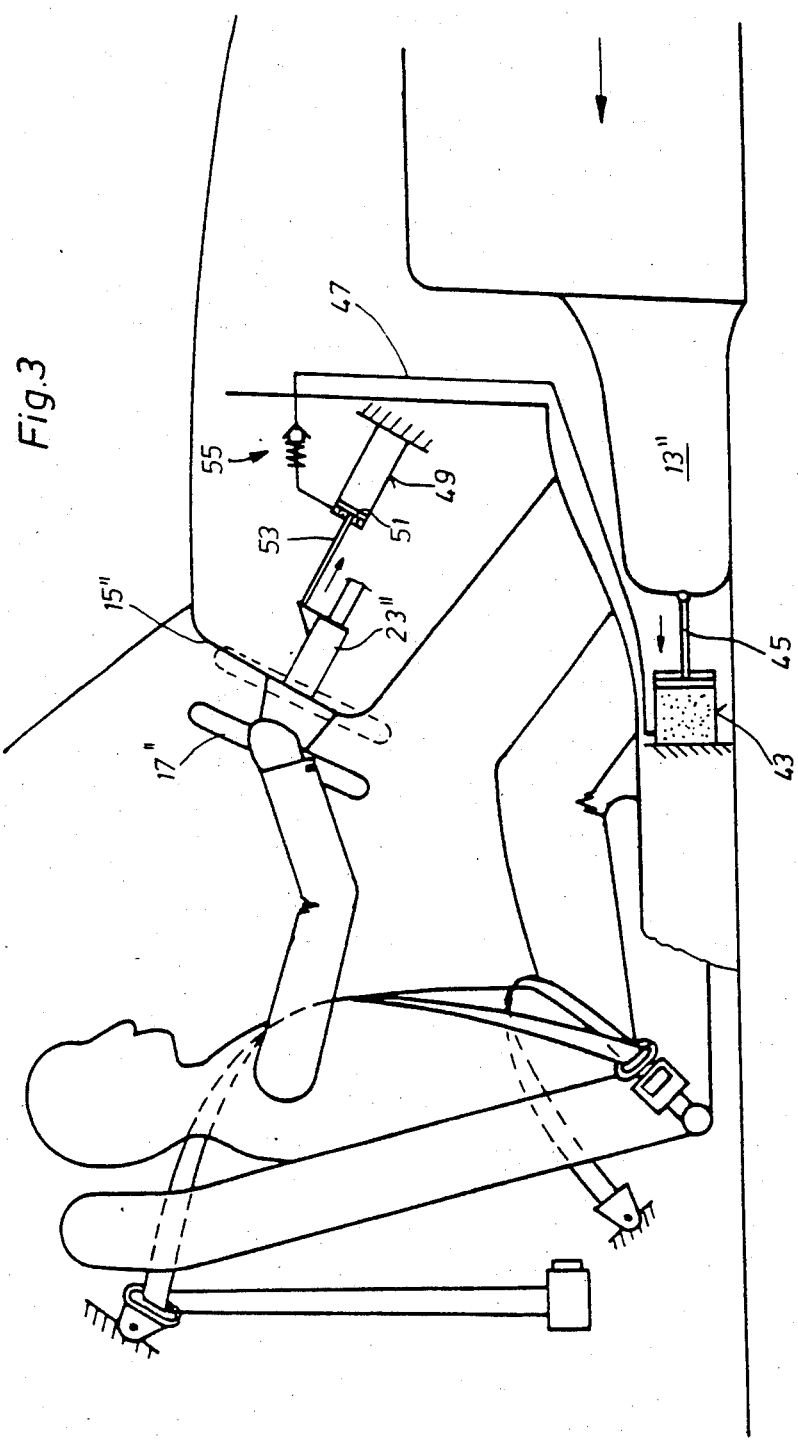
FIG. 3 shows a hydraulically actuated safety apparatus.

FIG. 3 depicts an embodiment in which relative movement is transferred hydraulically. Components the same as, or similar to, those of the previously described embodiments will be identified by the same reference characters double-primed.

In case of a frontal collision a donor cylinder 43 connected to the chassis of the vehicle will be pressurized because of the connection of its piston rod 45 with the transmission 13''. The hydraulic fluid is fed into a receiving or slave cylinder 49 by way of a hydraulic conduit 47 resulting in downward movement of the piston 51 and piston rod 53 of the slave cylinder 49. Because of the connection of the piston rod 53 to the bearing portion 23'' this movement simultaneously results in the steering wheel 17'' being pressed into the dashboard 15''. Recoiling or rebounding of the steering wheel 17'' is prevented by a check valve 55 in the hydraulic conduit 47. At a given relative movement the mechanical advantage yielding the necessary extent of movement (of the steering wheel) may be obtained by coordinating the effective diameters of donor cylinder 43 and slave cylinder 49.

Figure 4:
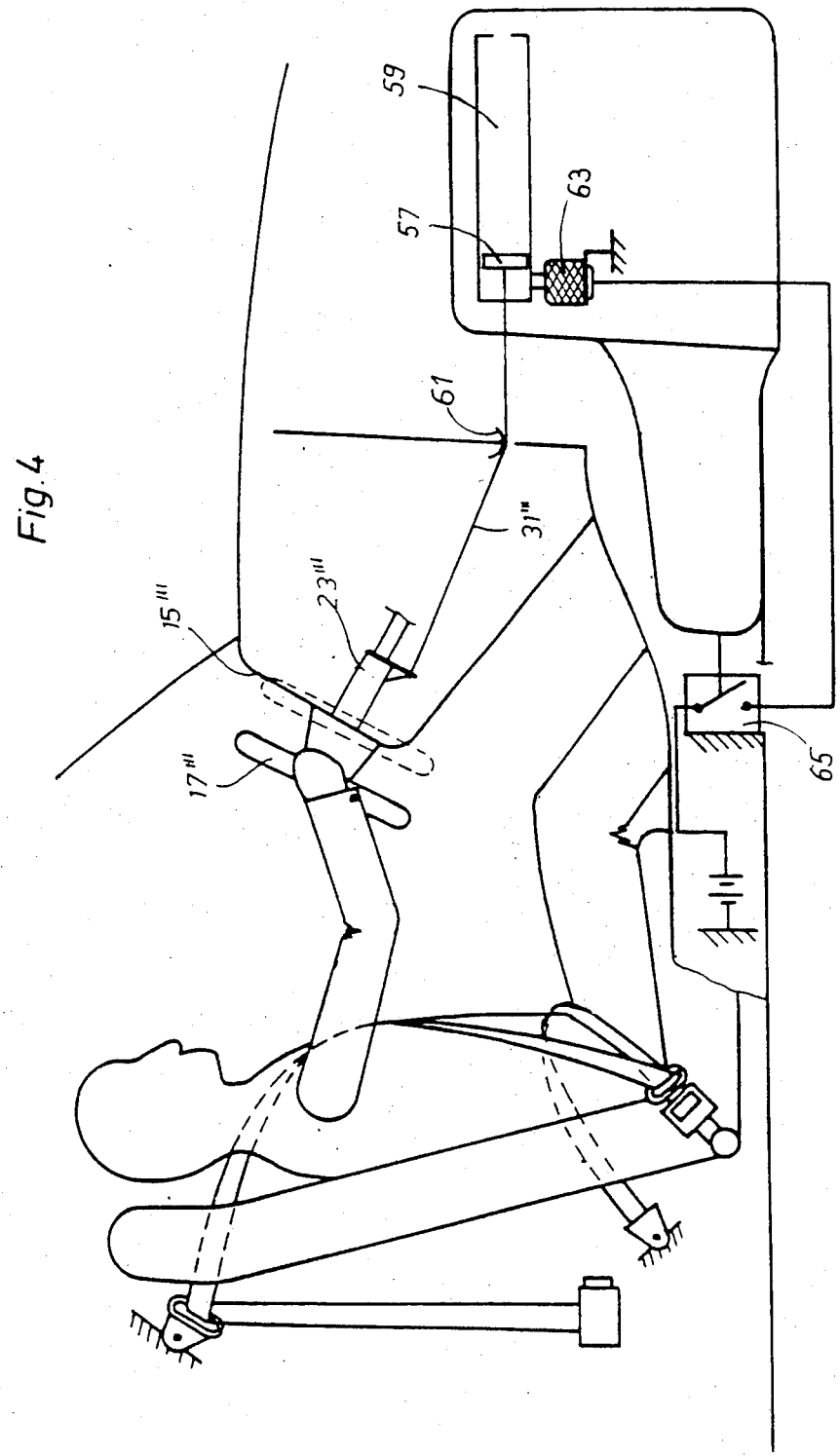
FIG. 4 shows a pyrotechnically actuated safety apparatus.

Finally, FIG. 4 depicts an embodiment in which the bearing portion 23''' together with the steering wheel 17''' are pulled towards the dashboard 15''' by pyrotechnical means, in case of a collision. For this purpose the cable 31''' is connected to the piston 57 of an explosion cylinder 59 and is guided around a bent deflection surface 61 towards the bearing portion 23''' with which it is also connected.

The explosive charge 63 affecting the explosion cylinder 59 is ignited electrically in case of a collision of predetermined magnitude. For this purpose a release sensor 65 rigidly mounted to the chassis is provided which ignites the charge 63 in case of relative movement of the engine and transmission unit against the sensor 65 resulting from a collision. The explosion causes the piston 57 and the steering wheel 17''' indirectly connected with it to be pulled in the direction of the front of the vehicle.

We claim:

1. An apparatus for enhancing the safety of a driver of an automobile vehicle comprising a chassis including a forward portion which in a collision exceeding a predetermined force is compactable in the direction of the collision, a relatively rigid aggregate comprising an engine mounted in said forward portion for relative movement rearwardly thereof in said collision, and a steering wheel mounted on a steering column and protruding towards said driver, comprising:

elongate flexible means having a predetermined tensile strength and comprising a first section operatively connected with said steering wheel and a second section integral with said first section and connected to said chassis; and means mounted on said aggregate and cooperating with said flexible means for converting said relative rearward movement of said aggregate into a force for pulling said steering wheel away from said driver by said first section of said flexible means.

2. The apparatus of claim 1, wherein said flexible means comprises a cable.

3. The apparatus of claim 1, wherein said converting means comprises a pulley mounted on said chassis, said cable being trained around said pulley.

4. The apparatus of claim 3, wherein said aggregate is provided with means adapted to engage said cable intermediate said pulley and the connection of said second section with said chassis, whereby said rearward movement of said aggregate causes movement of said steering wheel away from said driver.

5. An apparatus for enhancing the safety of a driver of an automotive vehicle comprising a chassis including a forward portion which in a collision exceeding a predetermined force is compactable in the direction of said collision, a relatively rigid aggregate comprising an engine mounted in said forward portion for relative movement rearwardly thereof in said collision, and a steering wheel mounted on a steering column and protruding towards said driver, comprising:

elongate flexible means having a predetermined tensile strength and comprising a first section operatively connected with said steering wheel and a second section integral with said first section and connected to said aggregate; and pulley means mounted on said chassis for training said flexible means therearound whereby said rearward movement of said aggregate causes movement of said steering wheel away from said driver.

6. The apparatus of claim 5, wherein said flexible means comprises a cable.

7. The apparatus of claim 6, further including means for limiting said force for moving said steering wheel away from said driver.

8. The apparatus of claim 7, further including means for retaining said steering wheel in a position away from said driver.

9. The apparatus of claim 8, wherein said force limiting means comprises means for breaking said flexible means between its said first and second sections.

* * * * *